United States Patent [19]

Nakamura et al.

[11] Patent Number: 4,902,212
[45] Date of Patent: Feb. 20, 1990

[54] SELF-LUBRICATING METALLIC MATRIX FOR INJECTION MOLDING

[75] Inventors: Susumu Nakamura; Koichi Yokoi, both of Yamanashi, Japan

[73] Assignee: Sankyo Engineering Co., Ltd., Yamanashi, Japan

[21] Appl. No.: 279,766

[22] Filed: Dec. 5, 1988

[30] Foreign Application Priority Data

Jun. 22, 1988 [JP] Japan .................... 63-152133

[51] Int. Cl.⁴ .............................................. B29C 45/33
[52] U.S. Cl. ..................................... 425/107; 425/577; 425/DIG. 58
[58] Field of Search ............... 425/DIG. 58, 577, 107, 425/DIG. 5; 252/12, 12.2

[56] References Cited

U.S. PATENT DOCUMENTS

| 3,574,658 | 4/1971 | Fulk et al. | 252/12 |
| 3,776,845 | 12/1973 | Watanabe et al. | 252/12 |
| 4,096,075 | 6/1978 | Nakamura | 252/12 |
| 4,371,445 | 2/1983 | Faigle | 252/12 |
| 4,515,342 | 5/1985 | Boskovic | 425/577 |
| 4,740,323 | 4/1988 | Suzuki et al. | 252/12 |
| 4,758,142 | 7/1988 | Voss et al. | 425/107 |
| 4,768,747 | 9/1988 | Williams et al. | 425/577 |
| 4,787,991 | 11/1988 | Morozumi et al. | 252/12 |

Primary Examiner—Jay H. Woo
Assistant Examiner—Timothy W. Heitbrink
Attorney, Agent, or Firm—Colucci & Umans

[57] ABSTRACT

A self-lubricating metallic matrix for injection molding, the matrix having an element having a lubrication requiring sliding wall in which a plurality of receiving holes are formed in such a positional relationship that end faces thereof may be positioned in a partially overlapping relationship with each other in the direction of such sliding movement, and a solid lubricant received in the receiving holes of the element.

5 Claims, 2 Drawing Sheets

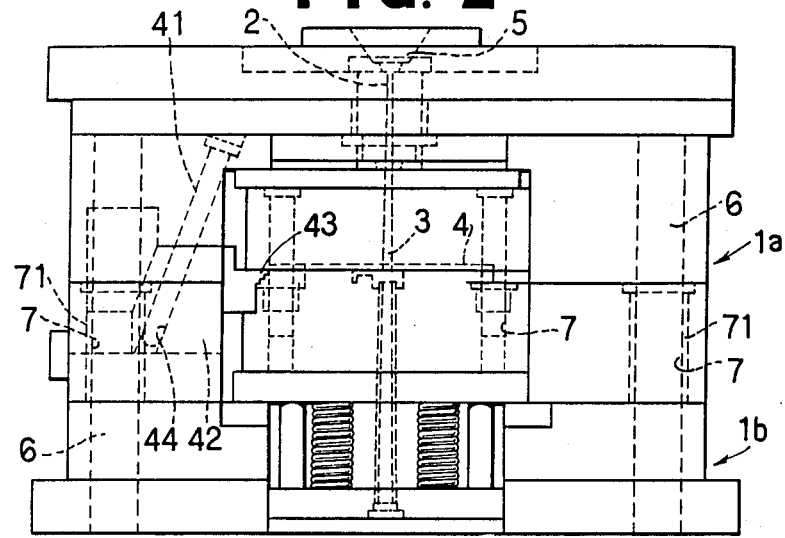
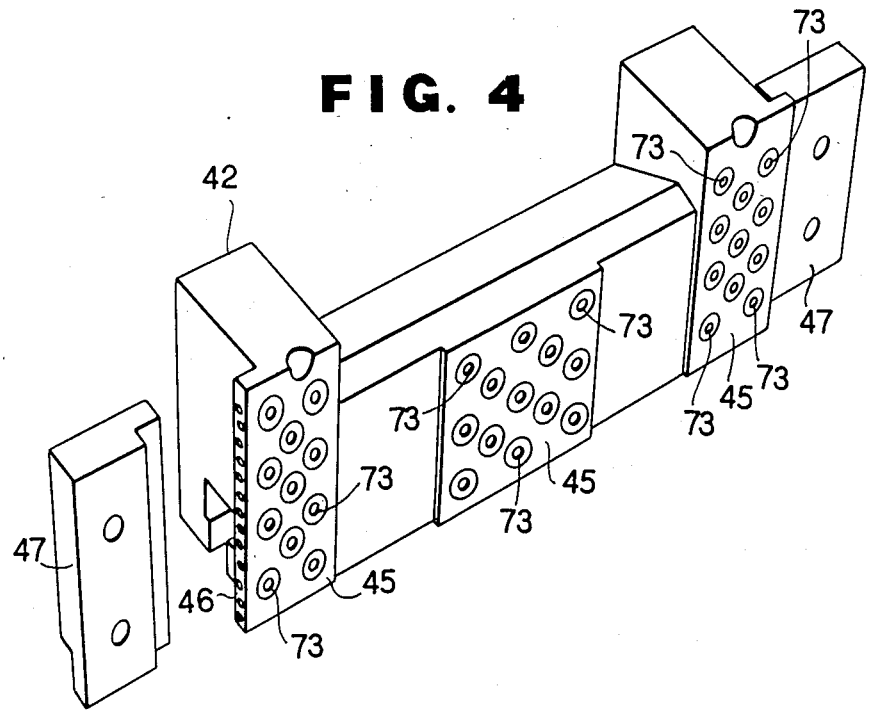

SELF-LUBRICATING METALLIC MATRIX FOR INJECTION MOLDING

BACKGROUND OF THE INVENTION

1. Field of the Invention

This invention relates to a metallic matrix for injection molding for injecting a molten material for molding such as a synthetic resin material into a molding section formed by a pair of metallic matrix elements including a core side metallic matrix element and a cavity side metallic matrix element.

2. Description of the Prior Art

A metallic matrix for injection molding normally has several lubrication requiring portions which are provided by guide holes formed in one of a core side metallic matrix element and a cavity side metallic matrix element and guide poles or guide pins provided on the other of the metallic matrix elements and fitted for sliding movement in the guide holes to allow opening and closing movement of the metallic matrix elements in order to fit the core side metallic matrix element with the cavity side metallic matrix element accurately, and another lubrication requiring portion provided by a retractable member such as a slide core for advancing into or retracting out of a cavity section to make up for molding. Sliding movements thus occur at a considerably high frequency at such lubrication requiring portions. Maintenance of such lubrication requiring portions is carried out by forced feed lubrication or by some other means such as application of paste-like oil such as grease to oil grooves formed on sliding walls of the metallic matrix element and the retractable member.

Thus, the metallic matrix for injection molding is exposed to a considerably high temperature of a molten synthetic resin or the like, and a sliding movement is repeated at a considerably high frequency on the metallic matrix. Accordingly, the conventional metal matrix for injection molding has a problem that a scuffing phenomenon may take place due to burning of oil or appearance of oil cake. There are further problems that reduction in accuracy of the metallic matrix may be caused by extraordinary abrasion of the same, which will result in reduction in accuracy of molded articles or at worst that operation of the metallic matrix may be disabled due to occurrence of a scuffing phenomenon or a seizure phenomenon. Also it is a problem that molded articles may be soiled due to scattering of grease or oil. Meanwhile, there is a problem that a cumbersome and time-consuming operation is required to replace lubricating oil itself or remove aged oil or clean lubrication requiring portions upon such replacement.

SUMMARY OF THE INVENTION

It is an object of the present invention to provide a self-lubricating metallic matrix for injection molding wherein a high lubricating effect can be assured at a high temperature and an operation of replacing aged oil or oil cake and cleaning lubrication requiring portions can be eliminated.

In order to attain the object, according to the present invention, a self-lubricating metallic matrix for injection molding comprises an element having a lubrication requiring sliding wall in which a plurality of receiving holes are formed in such a positional relationship that end faces thereof may be positioned in a partially overlapping relationship with each other in the direction of such sliding movement, and a solid lubricant received in the receiving holes of the element. The solid lubricant may consist of a main agent of graphite, black lead, molybdenum disulfide, paraffin or ethylene tetrafluoride resin.

Thus, with the self-lubricating metallic matrix according to the present invention, since the plurality of receiving holes for the solid lubricant formed in the sliding wall which is a lubrication requiring portion of the element are disposed in such a positional relationship that the end faces thereof may be positioned in a partially overlapping relationship in the direction of such sliding movement, that is, a tangential line X to one of the receiving holes which is drawn in parallel to the sliding direction may cross the plane of an adjacent one of the receiving holes without fail, the entire sliding face of a counterpart will pass and be lubricated by the solid lubricant received in the receiving holes during a single sliding movement of the element or the counterpart. Accordingly, the lubrication requiring portions can be lubricated in a well-balanced condition, and a lubricating effect for the lubrication requiring portions can be attained without using oil. Further, since the quality of the solid lubricant is not changed nor aged by a high temperature, it will stand a high temperature upon injection of a molten material and exhibit a good effect as a lubricant. Besides, it can exhibit an effect that an oil supplying operation and an operation of replacing aged oil can be eliminated.

The above and other objects, features and advantages of the present invention will become apparent from the following description and the appended claims, taken in conjunction with the accompanying drawings.

BRIEF DESCRIPTION OF THE DRAWINGS

FIG. 2 is a side elevational view of the metallic matrix of FIG. 1 in an assembled condition;

FIG. 4 is a perspective view of a slide core of the metallic matrix of FIG. 1 as viewed from the side of a bottom sliding wall of the same.

DETAILED DESCRIPTION OF THE PREFERRED EMBODIMENT

Figure 1:
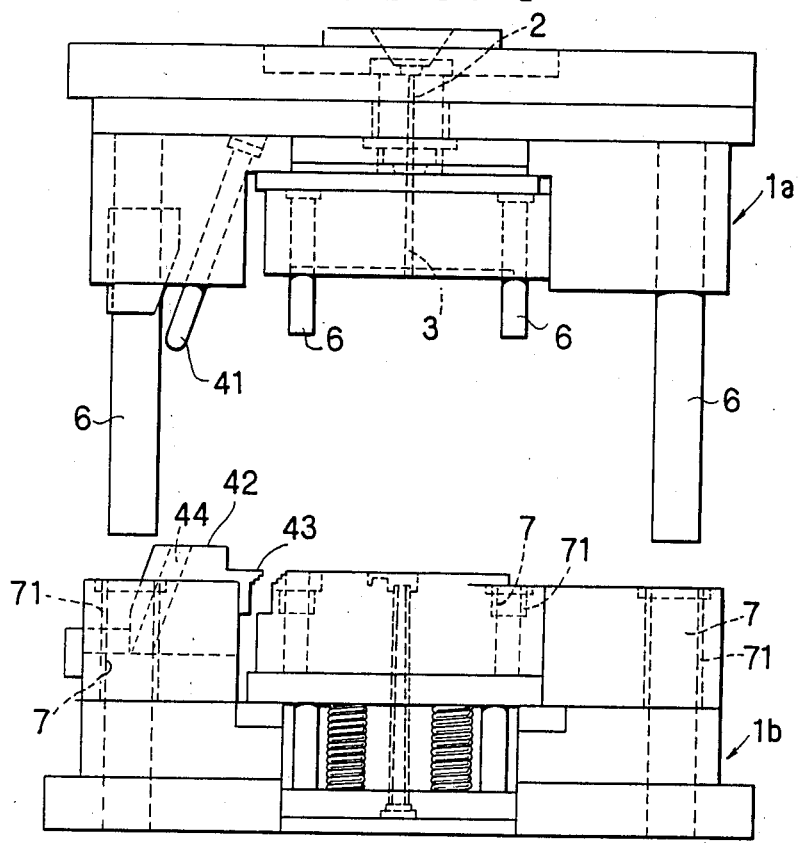
FIG. 1 is a side elevational view of a metallic matrix with a core side metallic matrix element separated from a cavity side metallic matrix element showing a preferred embodiment of the present invention.

Referring first to FIGS. 1 and 2, there is shown a metallic matrix for injection molding according to a preferred embodiment of the present invention. The metallic matrix shown includes a cavity side metallic matrix element 1a and a core side metallic matrix element 1b. The cavity side metallic matrix element 1a has a recessed nozzle touch 5 formed therein for fitting with a nozzle of an injector not shown from which a molten resin material is injected into the nozzle touch 5. The material injected into the nozzle touch 5 is passed successively through introducing paths 2 and 3 and filled under pressure into a molding section 4 which is formed by the metallic matrix elements 1a and 1b in a mutually fitting condition when molding is carried out. The cavity side metallic matrix element 1a has several guide poles 6 provided thereon for guiding opening and closing movement of the metallic matrix elements 1a and 1b while the core side metallic matrix element 1b has corresponding guide holes 7 formed therein for receiving the guide poles 6 of the cavity side metallic matrix element 1a.

Figure 3:
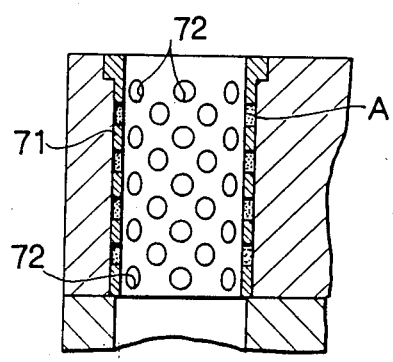
FIG. 3 is an enlarged sectional view showing a guide hole in which a bush is fitted.
Figure 5:
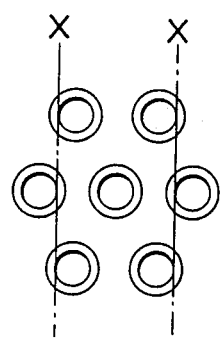
FIG. 5 is a schematic representation illustrating an arrangement of solid lubricant receiving holes.

A bush 71 is fitted in each of the guide holes 7 of the core side metallic matrix element 1b such that the corresponding guide pole 6 of the cavity side metallic matrix element 1b may be fitted over the entire sliding face thereof in the bush 71. As seen in FIG. 3, the bush 71 has a plurality of receiving holes 72 formed in a sliding wall thereof in such a positional relationship that end faces thereof may be positioned in a partially overlapping relationship in the direction of sliding movement of the guide pole 6. A solid lubricant A is received in each of the receiving holes 72 of the bush 71. The metallic matrix element 1b has an angular hole 44 formed therein while the other metallic matrix element 1a has an angular pin 41 provided thereon, and a slide core 42 is provided on the metallic matrix element 1b. When the metallic matrix element 1a is slidably moved to open or close the metallic matrix elements 1a and 1b, the angular pin 41 on the metallic matrix element 1a is advanced into or retracted from the angular hole 44 in the metallic matrix element 1b whereupon the slide core 42 moves an undercut core 43 into or out of a cavity of the molding section 4. The slide core 42 has a large number of receiving holes 73 formed in a sliding bottom wall 45 thereof and also in a sliding wall 46 thereof with a slider guide 47 in such a positional relationship that end faces thereof may be positioned in a partially overlapping relationship in the direction of sliding movement of the slide core 42. The solid lubricant A is received also in the receiving holes 73 in the slide core 42.

The receiving holes 72 and 73 have a suitable shape depending upon conditions of sliding actions of the associated parts, and a compound of a main agent consisting of graphite and molybdenum with some other material may suitably be used as the solid lubricant. It is to be noted that it is a matter of course that it is not necessary to use the solid lubricant for the entire lubrication requiring sliding portions of the metallic matrix but the solid lubricant may be used for major portions of the lubrication requiring sliding portions or otherwise it may be used together with lubricant oil.

Since the metallic matrix for injection molding according to the present invention has such a construction as described hereinabove, a high lubricating effect can be assured at a high temperature of the metallic matrix which is exposed to a high temperature by its nature. Besides, a cumbersome operation which is normally required due to appearance of oil cake or aged oil peculiar to oil lubrication can be eliminated, and an efficient metallic matrix can be obtained.

What is claimed is:

1. A self-lubricating metallic matrix for injection molding, comprising:
    a core side metallic matrix element;
    a cavity side metallic matrix element, said core and cavity side metallic matrix elements being movable toward and away from each other for closing and opening a mold cavity;
    means for injecting a molten material into the closed mold cavity to form a molded article in the mold cavity, the molded article being removable when the matrix elements are moved to open the cavity;
    at least one of said core and cavity side metallic matrix elements having a plurality of lubrication requiring surfaces which slide with respect to each other in a slide direction, during opening and closing of the cavity, each of said surfaces having a plurality of receiving holes distributed in a positional relationship so that said holes at least partially overlap each other during movement in the slide direction; and
    a solid lubricant received in each of said receiving holes for lubricating said lubrication requiring surfaces, and solid lubricant selected from the group consisting of graphite, molybdenum disulfide, paraffin, and tetrafluoridecontaining resin.

2. A self-lubricating metallic matrix for injection molding according to claim 1 wherein said solid lubricant is used together with lubricant oil.

3. A self-lubricating metallic matrix for injection molding according to claim 1, wherein said receiving holes are formed in a major portion of said lubrication requiring surfaces of said element.

4. A self-lubricating metallic matrix for injection molding according to claim 3 including a plurality of guide holes in one of said metallic matrix elements and a plurality of guide poles extending from the other of said metallic matrix elements, said guide holes being lined by said lubrication requiring surfaces.

5. A self-lubricating metallic matrix for injection molding according to claim 3 including a sliding core mounted for sliding movement to one of said metallic matrix elements, said sliding core carrying one of said lubrication requiring surfaces which slides against a surface of said one metallic matrix element.

* * * * *